(12) United States Patent
Audette et al.

(10) Patent No.: US 9,968,222 B2
(45) Date of Patent: May 15, 2018

(54) FLUID COMMUNICATION OF A BLENDER SYSTEM

(75) Inventors: David M. Audette, Webster, MA (US); Brian R. McGee, Tai Po (HK)

(73) Assignee: SHARKNINJA OPERATING LLC, Newton, MA (US)

( * ) Notice: Subject to any disclaimer, the term of this patent is extended or adjusted under 35 U.S.C. 154(b) by 1159 days.

(21) Appl. No.: 14/124,069

(22) PCT Filed: Jun. 8, 2012

(86) PCT No.: PCT/US2012/041560
§ 371 (c)(1),
(2), (4) Date: May 19, 2014

(87) PCT Pub. No.: WO2012/170821
PCT Pub. Date: Dec. 13, 2012

(65) Prior Publication Data
US 2014/0252146 A1 Sep. 11, 2014

Related U.S. Application Data (60) Provisional application No. 61/495,430, filed on Jun. 10, 2011.

(51) Int. Cl.
*A47J 43/07* (2006.01)
*A47J 43/046* (2006.01)
(Continued)

(52) U.S. Cl.
CPC ......... *A47J 43/0716* (2013.01); *A47J 27/004* (2013.01); *A47J 43/046* (2013.01); *A47J 43/06* (2013.01)

(58) Field of Classification Search
CPC .... A47J 43/0716; A47J 27/004; A47J 43/046; A47J 43/06
(Continued)

(56) References Cited

U.S. PATENT DOCUMENTS 4,362,277 A * 12/1982 Amiot ................... A47J 43/046
241/282.2
4,373,677 A * 2/1983 Kunihiro ............... A47J 43/046
241/282.1
(Continued)

FOREIGN PATENT DOCUMENTS

CN 201445415 U 5/2010
DE 3843703 A1 * 6/1990 ............ A47J 43/046
(Continued)

OTHER PUBLICATIONS

International Search Report and Written Opinion for International Application No. PCT/US2012/041560, dated Oct. 18, 2012.
(Continued)

*Primary Examiner* — Charles Cooley
(74) *Attorney, Agent, or Firm* — Cantor Colburn LLP (57) ABSTRACT

A blender is adapted to process and heat food products. The blender includes a base and a container coupled with the base. Disposed in the container is a work area and a processor component adapted to process food products. Disposed within the processor component is a fluid conduit through which steam may pass. The fluid conduit includes at least one outer wall and an interior lumen. The outer wall of the fluid conduit is separated from an inner wall of the processor component by a gap. The gap is in fluid communication with the work chamber. Disposed in the base is a reservoir (adapted to hold one or more fluids, e.g., water), which is in fluid communication with the interior lumen of the fluid conduit of the container. Steam formed in the reservoir passes from the reservoir into the work chamber by way of the interior lumen and the gap.

17 Claims, 10 Drawing Sheets

(51) Int. Cl.
*A47J 43/06* (2006.01)
*A47J 27/00* (2006.01)

(58) Field of Classification Search
USPC .......... 366/205, 206, 309, 312, 313; 99/348
See application file for complete search history.

(56) References Cited

U.S. PATENT DOCUMENTS

| | | | | |
|---|---|---|---|---|
| 4,410,280 | A * | 10/1983 | Yamauchi | A47J 43/046 241/282.1 |
| 5,329,069 | A * | 7/1994 | Amsel | A47J 43/046 177/132 |
| 5,372,422 | A * | 12/1994 | Dubroy | A47J 36/165 366/143 |
| 5,395,060 | A * | 3/1995 | Hackel | A47J 43/046 241/199.12 |
| 7,419,111 | B2 | 9/2008 | Gursel | |
| 7,677,485 | B2 | 3/2010 | Gursel | |
| 2001/0002891 | A1 * | 6/2001 | Frankel | A47J 43/0716 366/146 |
| 2002/0027175 | A1 | 3/2002 | Capp | |
| 2004/0065211 | A1 * | 4/2004 | McNair | A47J 27/004 99/348 |
| 2004/0237798 | A1 | 12/2004 | Payne | |
| 2006/0169812 | A1 * | 8/2006 | Galban | A47J 43/0722 241/282.1 |
| 2007/0102551 | A1 * | 5/2007 | Obersteiner | A47J 43/0777 241/282.1 |
| 2013/0233950 | A1 * | 9/2013 | Sandford | A47J 43/0722 241/27 |
| 2014/0231562 | A1 * | 8/2014 | Potter | A47J 43/0722 241/100 |
| 2014/0252146 | A1 * | 9/2014 | Audette | A47J 43/046 241/47 |

FOREIGN PATENT DOCUMENTS

| | | | | |
|---|---|---|---|---|
| EP | 0014637 A1 * | 8/1980 | | A47J 43/046 |
| KR | 2011002123 U | 3/2011 | | |
| WO | WO 2006/008583 A1 | 1/2006 | | |

OTHER PUBLICATIONS

International Preliminary Report on Patentability for International Application No. PCT/US2012/041560, dated Dec. 27, 2013.

* cited by examiner

FLUID COMMUNICATION OF A BLENDER SYSTEM

RELATED APPLICATIONS

This application claims priority to, and the benefit of, U.S. Provisional Application No. 61/495,430, filed Jun. 10, 2011, for all subject matter common to both applications. The disclosure of said provisional application is hereby incorporated by reference in its entirety.

FIELD OF THE DISCLOSURE

The present disclosure relates to blenders suitable for making baby foods and other food products. More particularly, the present disclosure relates to blenders adapted to both steam and blend food products, simultaneously if desired, and in the same food processing chamber.

BACKGROUND OF THE DISCLOSURE

Blenders are commonly used to process a wide variety of food products, in a wide variety of culinary and other consumer settings. For example, many parents or caretakers prefer to make their own baby food so that they can control, and thereby know with certainty, the various ingredients and food products their babies are consuming. However, to make many baby foods, a combination of functionality is required. For example, blenders must provide conventional food processing functions (e.g., mixing, blending, stirring, grinding, dicing, chopping, cutting, slicing, etc.), and must also provide heating/cooking functions (e.g., steaming, etc.).

Existing blenders fail to provide a device that possesses both of these functions while simultaneously remaining easy-to-use. For example, current attempts to provide a device that synthesizes both blender and heating/cooking functions typically require complex systems that are hard to clean, challenging to assembly/disassembly (e.g., for replacement in the event of damage), require manual movement of the partially processed food from one location to another to complete processing, and/or are generally large and unwieldy.

SUMMARY

Accordingly, there is a need for a blender adapted to steam and cook food products that is more convenient to handle, use, clean, and the like, to create an improved user experience. The present disclosure is directed toward solutions to address this and other needs, in addition to having other desirable characteristics that will be appreciated by one of skill in the art upon reading the present specification.

In accordance with an example embodiment of the present disclosure, a blender system is provided. The blender system can include a container. The container can include a bottom section. One or more container walls can extend from the bottom section and can define an interior volume of space. The interior volume of space can include a work chamber for processing one or more food products. A fluid conduit can have at least one conduit wall defining an interior lumen. The at least one conduit wall can be coupled to or integral with the bottom section of the container at a proximal end and can extend to a distal end within the work chamber. A processor component can surround the distal end of the fluid conduit and at least a portion of an exterior side of the at least one conduit wall with a gap therebetween. The gap can be in fluid communication with the interior lumen and the work chamber. The processor component can include at least one food processing feature. The container can be removably coupled to a base. The base can include a motorized drive configured to provide rotational force to a drive shaft. The drive shaft can be coupled with the processor component. A reservoir can be in fluid communication with the interior lumen of the fluid conduit. A heating component can be adapted to heat contents of the reservoir.

In accordance with aspects of the present disclosure, when heat energy provided to a liquid disposed in the reservoir by the heating component causes transformation of the liquid into a gas, gas can flow from the reservoir through the fluid conduit and the gap, and into the work chamber. The reservoir can be open at a first end, and the container can be removably coupled to the base at the first end of the reservoir in such a way that the fluid conduit is disposed above the reservoir and the interior lumen of the fluid conduit leads to the reservoir. A lid can be removably coupled to the container at an open end of the container. The lid can have one or more adjustable ventilation apertures. A lid can be removably coupled to the container at an open end of the container. The lid can include a body portion, one or more ventilation apertures disposed through the body portion, and a ventilation cover adjustable between a plurality of different ventilation positions each covering a different amount of the one or more ventilation apertures. The plurality of different ventilation positions can include a closed ventilation configuration in which the one or more ventilation apertures in the body portion are completely obstructed. The plurality of different ventilation positions can include one or more ventilation configurations predetermined as suitable for steaming or cooking a particular food product or category of food products.

In accordance with further aspects of the present disclosure, the at least one food processing feature can include one or more cutting blades, one or more mixing paddles, or both. The motorized drive can include an electric motor and a pulley system, a gear system, or both. The base further can include a control unit coupled to the motorized drive and adapted to control movement of the drive shaft and thereby the processor component. The container further can include a locking mechanism adapted to releasably lock with the base and an actuator adapted to enable release of the locking mechanism. The processor component can be removably coupled to the fluid conduit and can be adapted to remain removably coupled to the fluid conduit when the container is removed from the base.

In accordance with an example embodiment of the present disclosure, a container for a blender system is provided. The container can include a bottom section. One or more container walls can extend from the bottom section and can define an interior volume of space. The interior volume of space can include a work chamber for processing one or more food products. A fluid conduit can have at least one conduit wall defining an interior lumen. The at least one conduit wall can be coupled to or integral with the bottom section of the container at a proximal end and can extend to a distal end within the work chamber. A processor component can surround the distal end of the fluid conduit and at least a portion of an exterior side of the at least one conduit wall with a gap therebetween. The gap can be in fluid communication with the interior lumen and the work chamber. The processor component can include at least one food processing feature. Coupling the container to a base can cause the processor component to couple with a drive shaft coupled to a motorized drive in the base, and can establish fluid communication between the interior lumen of the fluid conduit and a reservoir in the base.

In accordance with aspects of the present disclosure, the container can be adapted to removably couple with the base and can be adapted to be received by a first open end of the reservoir in such a way that the fluid conduit is disposed above the reservoir and the interior lumen of the fluid conduit leads to the reservoir. A lid can be removably coupled to the container at an open end of the container. The lid can include one or more adjustable ventilation apertures. A lid can be removably coupled to the container at an open end of the container. The lid can include a body portion, one or more ventilation apertures disposed through the body portion, and a ventilation cover adjustable between a plurality of different positions each covering a different amount of the one or more ventilation apertures. The at least one food processing feature can include one or more cutting blades, one or more mixing paddles, or both.

In accordance with an example embodiment of the present disclosure, a base is provided for a blender system. The base can include a motorized drive configured to provide rotational force to a drive shaft. A reservoir can have an open end adapted to removably receive a bottom section of a container. A heating component can be adapted to heat contents of the reservoir. Coupling the container to the base in such a way that the bottom section of the container is releasably received by the open end of the reservoir can cause the drive shaft to couple with a processor component in the container that includes one or more food processing features, and can establish fluid communication between the reservoir and a work chamber in the container via an interior lumen of a fluid conduit in the container.

In accordance with aspects of the present disclosure, the motorized drive can include an electric motor and a pulley system, a gear system, or both. A control unit can be coupled to the motorized drive and adapted to control movement of the drive shaft and thereby the processor component.

BRIEF DESCRIPTION OF THE FIGURES

These and other characteristics of the present disclosure will be more fully understood by reference to the following detailed description in conjunction with the attached drawings, in which.

DETAILED DESCRIPTION

An illustrative embodiment of the present disclosure relates to a blender adapted to process (e.g., mix, blend, stir, puree, grind, dice, chop, cut, slice, etc.) and heat (e.g., steam, cook, etc.) food products in a single food processing chamber (i.e., word area). The blender includes a base and a container adapted to releasably couple with the base. Disposed in the container is a work area and a processor component adapted to process food products contained in the work area of the container. As an example, the processor component can include a cylindrical support member extending from a bottom interior surface of the container and having one or more food processing features (e.g., blades, paddles, etc.) extending therefrom. Disposed within the processor component is a fluid conduit through which fluid (in particular gas, such as steam) may pass. The fluid conduit includes at least one outer wall and an interior lumen. The outer wall of the fluid conduit is separated from an inner wall of the processor component by a gap. The gap is in fluid communication with the work chamber. Disposed in the base is a reservoir adapted to hold one or more fluids (e.g., liquids in particular). Securely coupling the container to the base establishes fluid communication between the reservoir in the base and the interior lumen of the fluid conduit of the container. In this way, a continuous passageway is formed through which steam (or other food processing gas) can pass from the reservoir into the work chamber. Gas that is generated in the reservoir thus travels through the interior lumen of the fluid conduit, then into the gap between the fluid conduit and the process component, and then into the work chamber (e.g., through one or more apertures in the processor component and/or through a separation between the processor component and a bottom interior surface of the container).

FIGS. 1 through 10, wherein like parts are designated by like reference numerals throughout, illustrate example embodiments of a blender according to the present disclosure. Although the present disclosure will be described with reference to the example embodiments illustrated in the figures, it should be understood that many alternative forms can be embodied. One of skill in the art will appreciate a variety of ways to alter the parameters of the disclosed embodiments, such as the size, shape, or type of elements or materials, in a manner still in keeping with the spirit and scope of the present disclosure.

Figure 1:
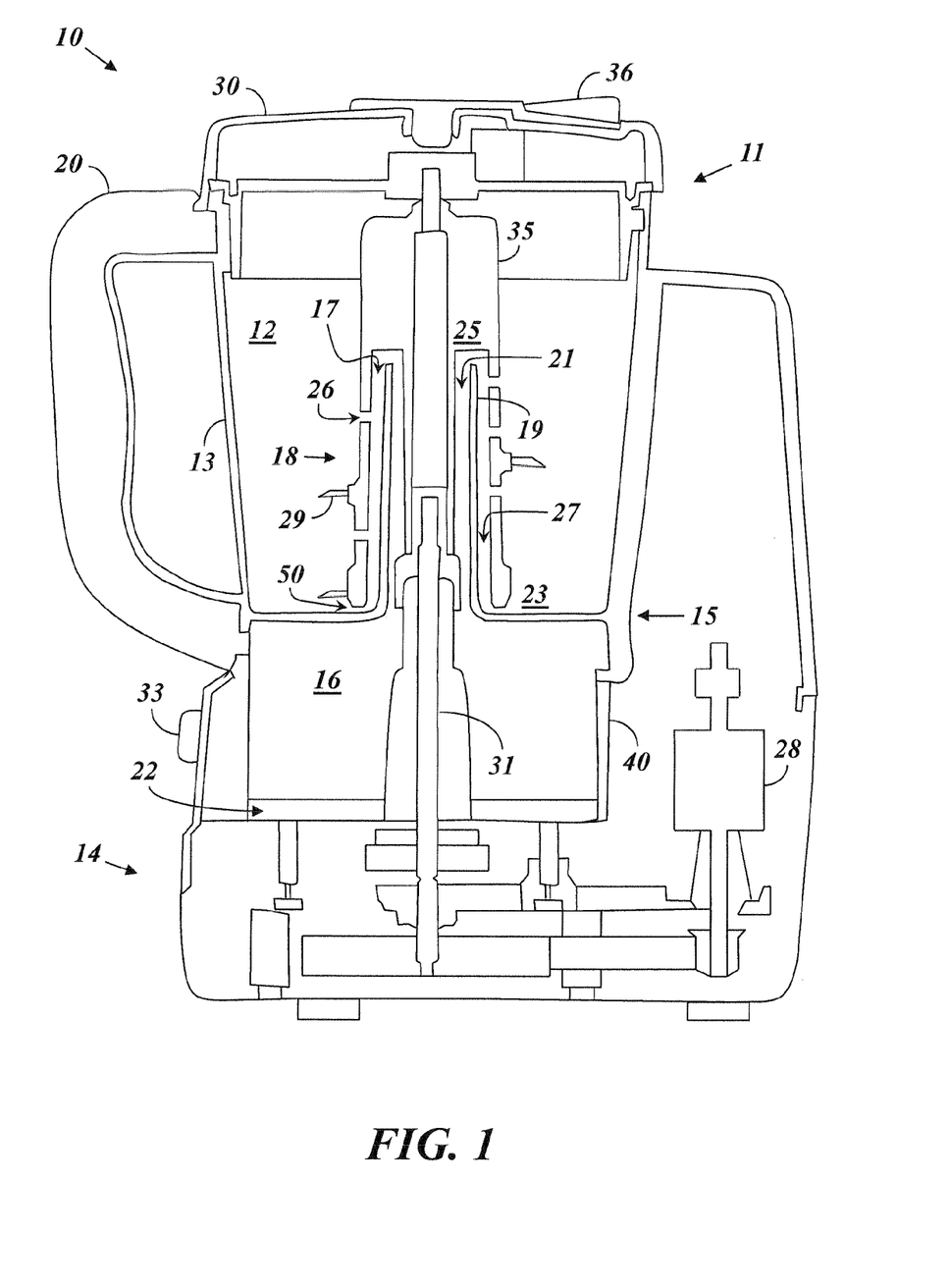
FIG. 1 is a cross-sectional view of a blender including a base and a container, according to an example embodiment of the present disclosure.
Figure 2:
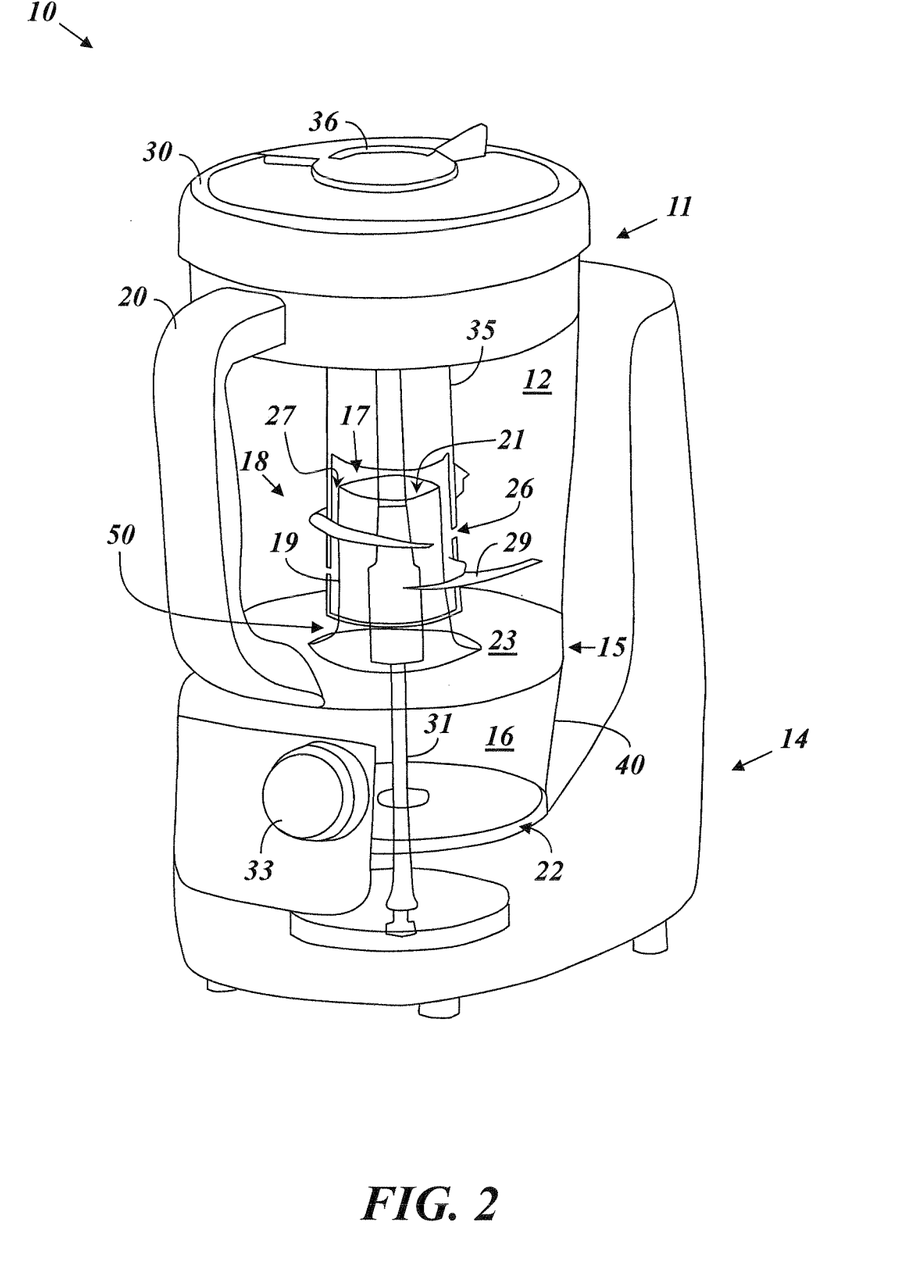
FIG. 2 is a perspective view of the blender of FIG. 1 with various components shown as transparent for illustration, according to aspects of the present disclosure.
Figure 3:
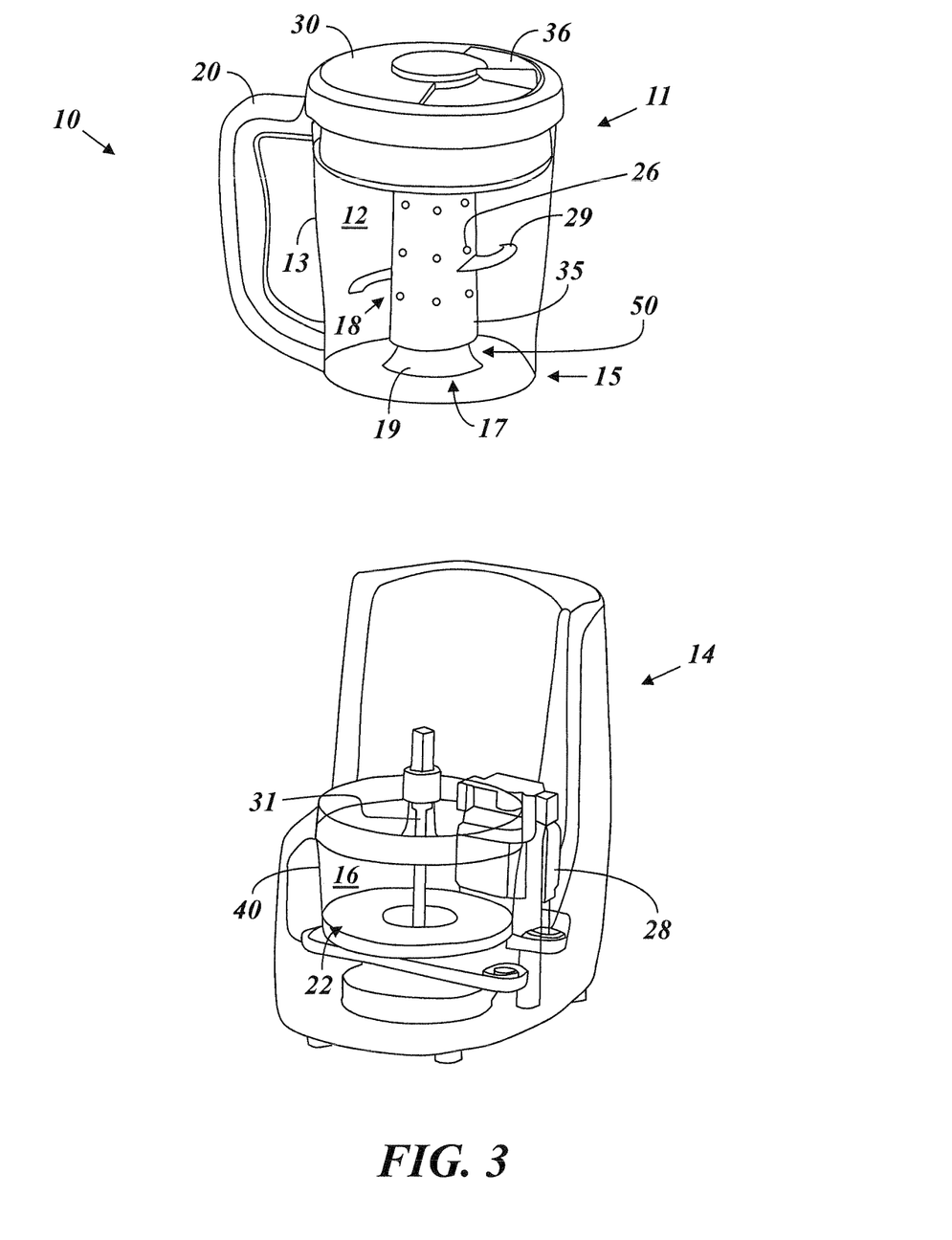
FIG. 3 is an exploded view of the blender of FIG. 1 with various components shown as transparent for illustration, according to aspects of the present disclosure.

Reference is made to FIGS. 1 through 3, which depict a cross-sectional view, a perspective view, and an exploded view, respectively, of a blender 10 for heating and processing food products according to an example embodiment of the present disclosure. In general, the blender 10 includes a container 11 removably coupled to a base 14. The container 11 has one or more container walls 13 extending from a bottom section 15 of the container 11. As a non-limiting example, the one or more container walls 13 can be generally cylindrical or cone-shaped. The one or more container walls 13 define an interior volume of space within which is disposed a work chamber 12 for receiving and processing one or more food products. In addition, the container 11 includes a handle 20 coupled to the one or more container walls 13 for gripping (e.g., and transporting) the container 11.

It should be appreciated that the term "bottom" is used herein in reference to the orientation depicted in the example embodiment of FIGS. 1 through 3 and is used only for purposes of clarity and illustration. This term and designation in no way limits embodiments of the present disclosure. Rather, the relative directions and designations equivalently can be reversed (e.g., such that the top and the bottom are reversed, the bottom and a left or right side are reversed, and the like), as would be appreciated by one of skill in the art upon reading the present specification. Any suitable orientation of the blender 10 and corresponding terminology can be utilized when describing and orienting embodiments of the present disclosure.

The work chamber 12 is adapted to receive one or more food products. The present disclosure is not limited to any particular type, size, or composition of food products. Rather, the container 11 can be implemented (e.g., sized, dimensioned, etc.) such that the work chamber 12 is capable of receiving and processing any desired food product. As non-limiting examples, the work chamber 12 can be adapted to receive bread, rice, pasta, vegetables, fruits, dairy products, meats, fish, poultry, fats and oils, vitamins, and/or supplements. In illustrative embodiments, the blender 10 is utilized in operation to make baby food products, as would be appreciated by one of skill in the art upon reading the present specification. However, the blender 10 can be adapted for use with any food products (e.g., for babies, humans, animals, and the like).

The container 11 includes a fluid conduit 17 coupled to or integral with the bottom section 15 of the container 11 at a proximal end 23 thereof. A distal end 25 of the fluid conduit 17 is disposed in the work chamber 12. The fluid conduit 17 includes at least one conduit wall 19 defining an interior lumen 21 through which fluids (e.g., gases in particular) may pass.

A processor component 18 may be situated within the work chamber 12 for blending or otherwise processing the food products. The processor component 18 may include, as a non-limiting example, a generally cylindrical support member 35 with one or more food processing features 29 (e.g., blades, paddles, etc.) extending therefrom. In the example embodiment FIGS. 1 through 3, the one or more food processing features 29 include one or more blades. Examples of other suitable blades and supporting units may be found in U.S. Pat. Nos. 7,419,111 and 7,677,485, filed Jun. 4, 2003 and Aug. 29, 2008, respectively, each of which is incorporated herein by reference in its entirety for all purposes. Upon reading the present specification, one of skill in the art will appreciate many other types of blades and/or food processing features 29 can be included in the blender 10. All such alternatives and modifications are included herein and contemplated as within the scope of the present disclosure. The present disclosure is not limited to the illustrative examples described herein. The processor component 18 generally can be adapted to blend, puree, grind, mix, stir, cut, chop, dice, slice, or otherwise process the one or more food products disposed in the work chamber 12.

The processor component 18 can be securely coupled to the fluid conduit 17 (e.g., removably coupled to the fluid conduit 17) in such a way that the processor component 18 is disposed over and surrounds at least the distal end 25 of the fluid conduit 17. For example, the processor component 18 can be substantially cylindrical in shape, can be generally hollow, and can be adapted to fit over the fluid conduit 17. In illustrative embodiments of the present disclosure, the processor component 18 is securely coupled to the fluid conduit 17 and is disposed over and around the fluid conduit 17 in such a way as to form a gap 27 therebetween. More specifically, the gap 27 is a space that extends between an interior face of the processor component 18 at least a portion of an exterior face of the fluid conduit 17. For example, the gap 27 can be a generally cylindrical gap 27 (e.g., having an annular cross-section) extending both around an exterior of the fluid conduit 17 and along a height of the fluid conduit 17. In illustrative embodiments of the present disclosure, the processor component 18 is separated from the bottom section 15 of the container 11. For instance, as depicted to in the example embodiment of FIGS. 1 through 3, a separation 50 exists between a bottom surface of the processor component 18 and an upper surface of the bottom section 15 of the container 11.

In accordance with embodiments of the present disclosure, the gap 27 between the fluid conduit 17 and the processor component 18 is in fluid communication with the work chamber 12. For instance, in the example embodiment of FIGS. 1 through 3, the gap 27 is in fluid communication with the work chamber 12 both (a) by way of one or more apertures 26 extending entirely through the processor component 18 and leading from the gap 27 to the work chamber 12, and (b) by way of the separation 50 between the processor component 18 and the bottom section 15 of the container 11. Accordingly, in the example embodiment of FIGS. 1 through 3, the gap 27 between the fluid conduit 17 and the processor component 18 is contiguous with the interior lumen 21 of the fluid conduit 17, the one or more apertures 26 (each of which is contiguous with the work chamber 12), and the separation 50 between the bottom of the processor component 18 and the bottom section 15 of the container 11 (which is contiguous with the work chamber 12). In this way, steam rising through the fluid conduit 17 is enabled to pass directly from (i) the interior lumen 21 of the fluid conduit 17 to (ii) the gap 27 to (iii) the one or more apertures 26 and/or the separation 50 to (iv) the work chamber 12.

Figure 10:
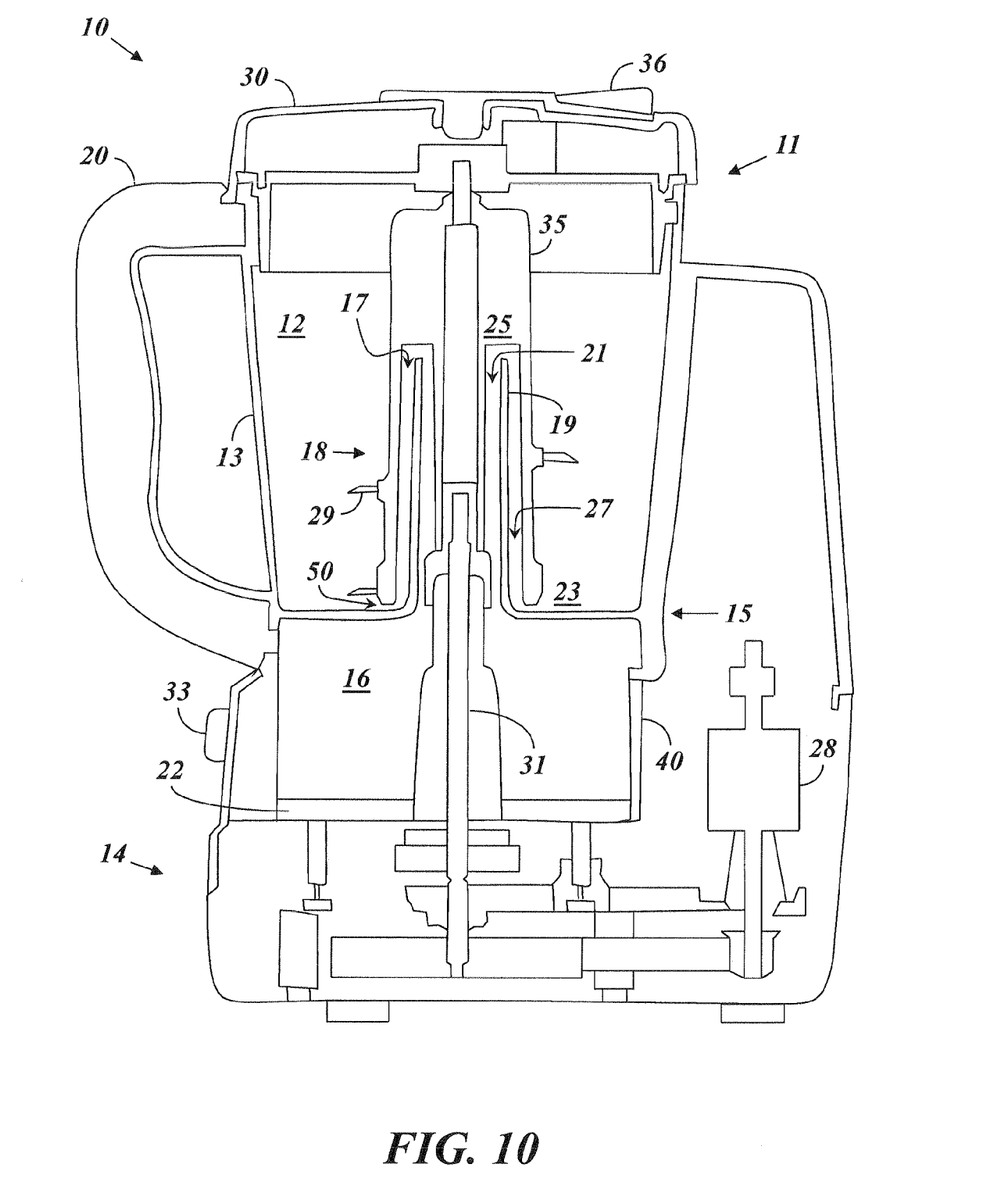
FIG. 10 is a cross-sectional view of a blender including a base and a container, according to an example embodiment of the present disclosure.

In accordance with some embodiments of the present disclosure, the one or more apertures 26 are not included in the process component 18. For example, FIG. 10 depicts an embodiment in which the processor component 18 includes the generally cylindrical support member 35 with no apertures 26 formed therein. In such embodiments, steam rising through the fluid conduit 17 is enabled to pass directly from the interior lumen 21 of the fluid conduit 17, through the gap 27 and the separation 50, and out to the work chamber 12.

As described previously herein, the container 11 is removably coupled to the base 14, which is configured to releasably receive the container 11 as substantially shown in the figures. A plurality of electrical and/or mechanical devices and/or components may be stored within the base 14. The base 14 may include a motorized drive 28 configured to cause the one or more food processing features 29 to revolve or turn (e.g., about the cylindrical support member 35). For example, the motorized drive 28 may include a gearbox such as a mechanical or rotational motor for providing rotational force to a drive shaft 31. Furthermore, for embodiments where the motorized drive 28 includes a motor, the motorized drive 28 may include a pulley system and/or gear system coupling the motor to the drive shaft 31. When the container 11 is coupled to the base 14, the drive shaft 31 can couple with the processor component 18, e.g., via a standard coupling. In some embodiments, the base 14 additionally includes a power source (e.g., a battery) adapted to supply power to the motorized drive 28. In other embodiments, power may be supplied to the motorized drive 28 via one or more electrical cords adapted to plug into a wall socket (not shown). Upon reading the present specification, one of skill in the art will appreciate yet other types of power sources that can be used to implement the blender 10. All such alternatives and modifications are contemplated within the scope of the present disclosure. Any suitable power source can be utilized to power the various components of the blender 10.

In one example embodiment, the motorized drive 28 is a 200 W motor. In other embodiments, the motorized drive 28 has a higher or lower power (e.g., 100 W, 300 W, 500 W), as can be selected to meet the particular outlet voltage and/or amp requirements, as would be appreciated by one of skill in the art upon reading the present specification. In some embodiments, a control unit 33 is mounted on an exterior of the base 14 for controlling the operation of the blender 10, as depicted in the example embodiment of FIGS. 1 through 3. The control unit 33 can be coupled to the motorized drive 28 and adapted to control motion of the drive shaft 31 and thereby control motion of the processor component 18.

In illustrative embodiments, the blender 10 includes a reservoir 16 situated below the work chamber 12 for receiving and holding water or other cooking or heating liquids (e.g., in pre-determined amounts as indicated by line markings disposed in sides of the reservoir 16. The blender 10 further can include a heating component 22, as depicted in FIGS. 1 through 3. The heating component 22 can be adapted to produce heat that is absorbed by the water (or other liquid) contained in the reservoir 16 in an amount sufficient to transform the water (or other liquid) contained within the reservoir 16 into steam (or other gas). For example, in the embodiment of FIGS. 1 through 3, the reservoir 16 is included in the base 14 and is positioned at a location that is directly below the work chamber 12 and the fluid conduit 17 when the container 11 is coupled to the base 14. Furthermore, in the example embodiment of FIGS. 1 through 3, the reservoir 16 is contiguous with the interior lumen 21 of the fluid conduit 17 when the container 11 is coupled with the base 14. The base 14 can include a power source adapted to provide power to the heating component 22 (e.g., which can be the same as or different from the power source adapted to power the motorized drive 28). The heating component 22 is a resistance heat element, which is electrically powered.

In operation, steam (or other gas) produced by heating the water (or other liquid) in the reservoir 16 passes into the interior lumen 21 of the fluid conduit 17, into the gap 27, and subsequently into the work chamber 12 via the one or more apertures 26 in the processor component 18 and/or the separation 50 between the processor component 18 and the bottom section 15. Accordingly, by providing a pathway for such steam (or other gas) to enter work chamber 12 from the reservoir 16, food products contained within the work chamber 12 can be cooked, heated, moistened, and the like. In accordance with the present disclosure, the processor component 18 may be activated before, during, and/or after introduction of the steam (or other gas) to process the food in the work chamber 12. Of particular note is that there is no requirement to move the food into different work chambers when heating verses food processing operations are desired.

Likewise, there is no requirement to perform one operation at a time that is distinct from another operation (i.e., heating and food processing do not need to occur separately at different times). The configuration of illustrative embodiments provided herein enables the heating and processing of food within the same work chamber 12 and at the same time, if so desired.

In the example embodiment of FIGS. 1 through 3, water (or other fluid) may be initially added to the reservoir 16 by (a) removing the container 11 from the base 14, (b) pouring water (or other fluid) through the open upper end of reservoir 16 and into the reservoir 16, (c) recoupling the container 11 with the base 14. Power then may be provided to the heating component 22 for converting the water stored within the reservoir 16 to steam.

In some embodiments, the blender 10 further includes a lid 30, as illustrated in the example embodiment of FIGS. 1 through 3. The lid 30 can aid in ensuring that food products contained in the work chamber 12 remain securely therein during, before, and/or after the food products are being processed and/or cooked. In some example embodiments, the lid 30 includes one or more ventilation apertures 34 for venting the steam (or other gas) produced during the cooking process. The lid 30 can include one or more damper elements (not shown) adapted to control outflow of gas through the one or more ventilation apertures 34 (i.e., to control/regulate the amount and/or rate of gas flowing from the work chamber 12 through the ventilation apertures 34 to an environment external to the container 11).

Figure 4:
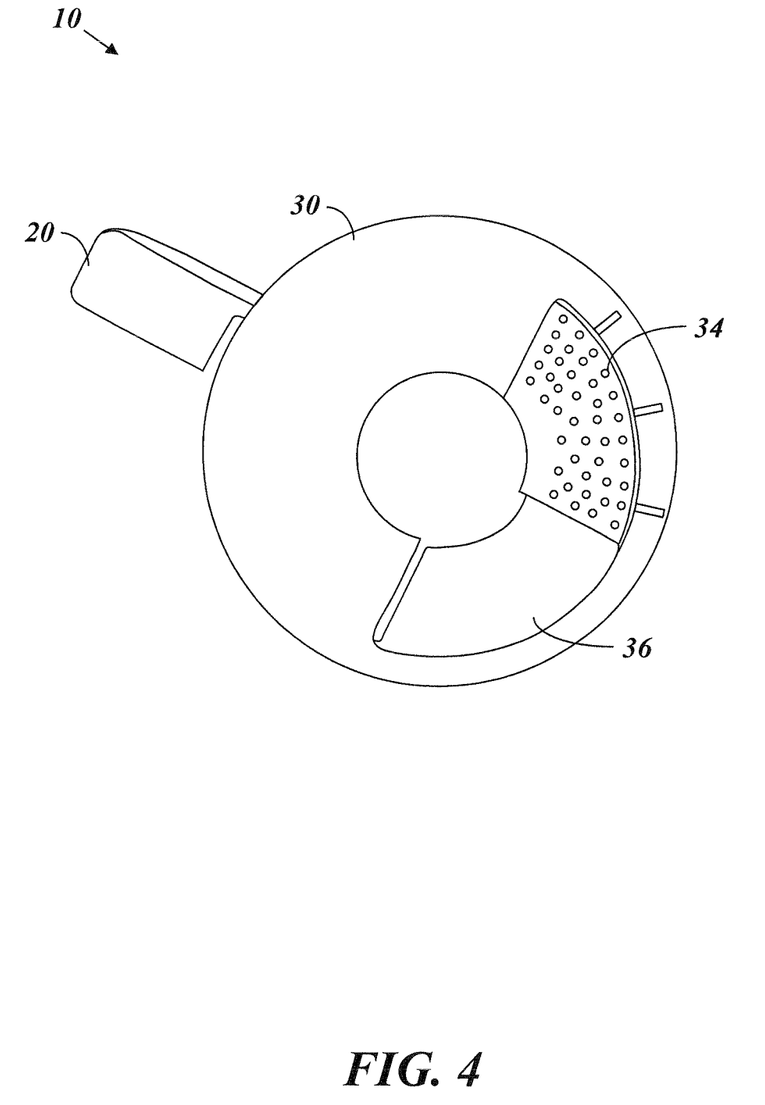
FIG. 4 is a top view of the blender of FIG. 1 with a lid having one or more ventilation apertures, according to aspects of the present disclosure.
Figure 5:
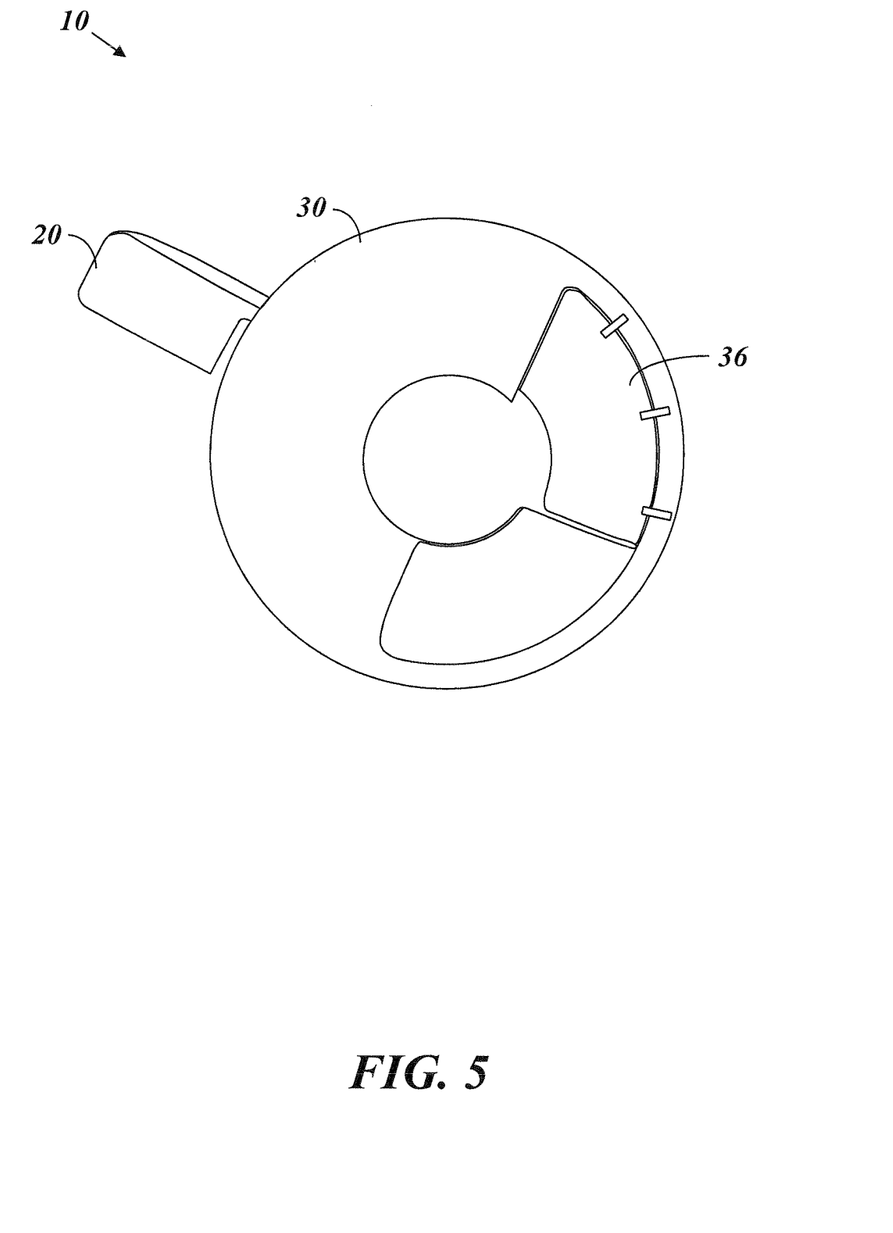
FIG. 5 is a top view of the blender of FIG. 4 with a ventilation cover disposed in a fully closed ventilation position, according to aspects of the present disclosure.

In accordance some with some illustrative embodiments of the present disclosure, the lid 30 provides controlled ventilation through one or more ventilation covers. For example, FIG. 4 depicts a top view of the lid 30 further including a ventilation cover 36 adapted to assume a plurality of different ventilation positions, in accordance with a further example embodiment of the present disclosure. In each of the plurality of different ventilation positions that the ventilation cover 36 is adapted to assume, the ventilation cover 36 covers a different amount of the one or more ventilation apertures 34. Accordingly, the ventilation cover 36 can be movable (e.g., rotatable, slidable, selectable, etc.) between the plurality of different ventilation positions to provide varying levels or quantities of ventilation of the steam (or other gas) during operation of the blender 10 in a steaming process. The plurality of different ventilation positions that the ventilation cover 36 is adapted to assume can include a fully open ventilation position (depicted in FIG. 4) in which all of the one or more ventilation apertures 34 are fully uncovered. Additionally, the plurality of different ventilation positions that the ventilation cover 36 is adapted to assume can include a fully closed ventilation position (depicted in FIG. 5), in which all of the one or more ventilation apertures 34 are completely obstructed and gas in not enabled to pass therethrough. The plurality of different ventilation positions further can include one or more different ventilation positions (e.g., intermediate positions between the fully open ventilation position and the fully closed ventilation position) each adapted to release a desired amount of steam, which can be determined to correspond to a specific food product or category of food products to adjust heating conditions within the work chamber 12. For example, one or more of the plurality of ventilation positions each can provide an uncovered amount of the one or more ventilation apertures 34 that has been predetermined to release an amount of steam (or other gas) and thereby retain a desired amount of heat that is suitable for cooking a particular food product or category of food products.

Figure 6:
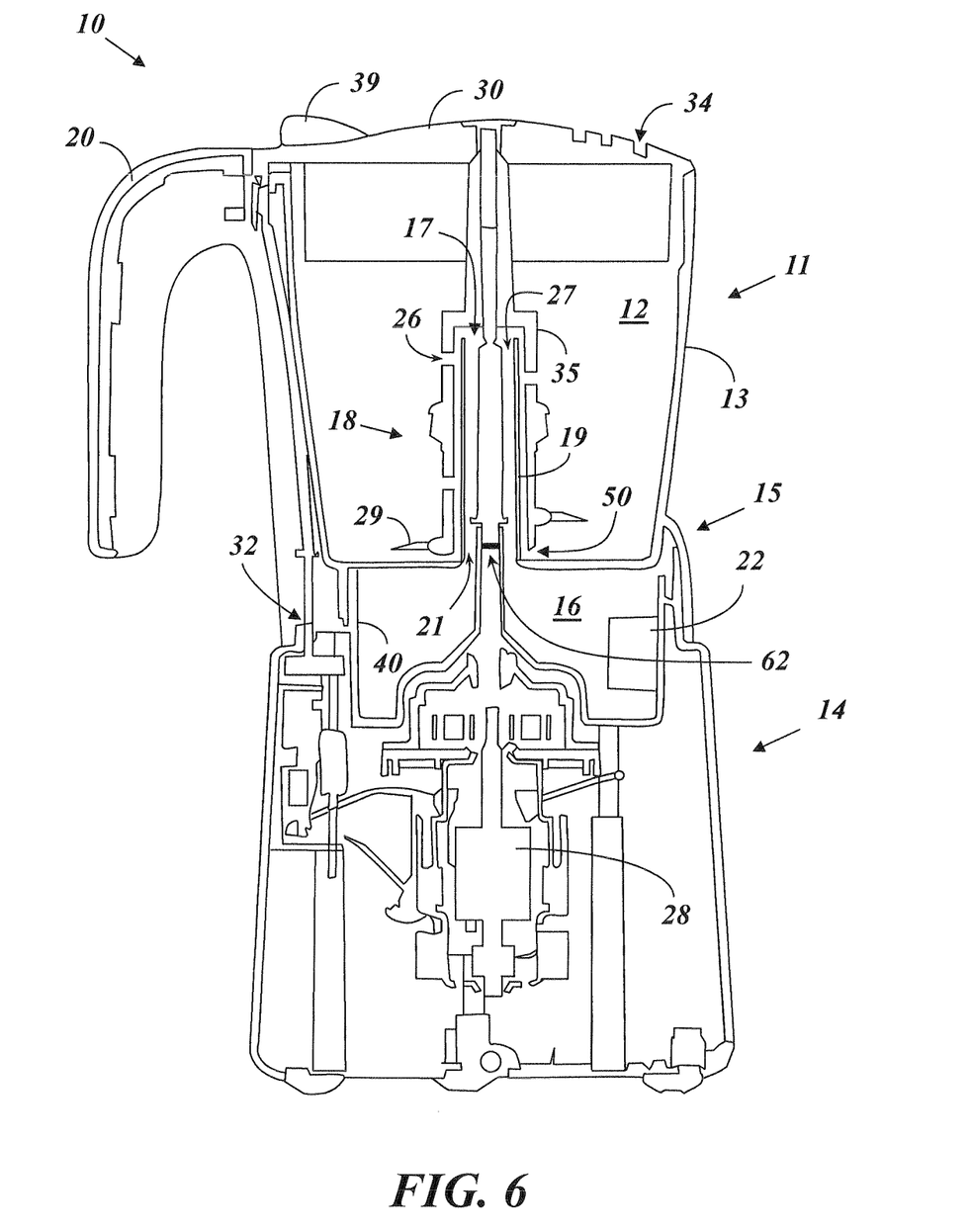
FIG. 6 is a cross-sectional schematic view of a blender having a releasable locking (e.g., latching) mechanism, according to an example embodiment of the present disclosure.

In accordance with some example embodiments of the present disclosure, the blender 10 further includes a locking mechanism. For example, FIG. 6 depicts the blender 10 in accordance with another example embodiment, in which the lid 30 includes a locking mechanism 32 (e.g., lock-and-release columns with detents, etc.) disposed in the handle 20 of the container 11 and adapted to couple with a lock-and-release trigger 39 (e.g., a button or tab) included in the lid 30. The lock-and-release trigger 39 and the locking mechanism 32 can be adapted to enable the container 11 to couple and/or release from the base 14 only when the lock-and-release trigger 39 is depressed by a user.

In accordance with example embodiments of the present disclosure, the lid 30 may include a pour spout (not shown) to enable spill-free pouring of food products from the work chamber 12 into a separate mixing bowl, serving bowl, pot, other container, or the like, as would be readily understood by those of skill in the art.

The reservoir 16 and the base 14 can be integrated together, as a single unit. For example, in the embodiment of FIG. 1, the reservoir 16 is integrally molded with the base 14. In particular, as depicted in FIG. 1, the reservoir 16 is formed by one or more reservoir walls 40 that are integral with the base 14 and that form an upper portion of the base 14 (as oriented in the example embodiment of FIGS. 1 through 3). The one or more reservoir walls 40 can be open at the upper portion of the base, as illustrated. In the example embodiment of FIGS. 1 through 3, the container 11 is removably coupled to the base 14 at the open upper portion of the reservoir 16. In this way, the interior lumen 21 of the fluid conduit 17 is disposed above and is contiguous with the reservoir 16, such that the reservoir 16 leads directly to the interior lumen 21 of the fluid conduit 17.

Alternatively, the reservoir 16 may be closed at the upper end of the base 14 and may include an upper surface (not shown) adapted to mate with (e.g., conform in shape with) the bottom section 15 of the container 11. In this way, the container 11 may be adapted to releasably couple with the base 14 by mounting to the upper surface (not shown) of the reservoir 16 covering the reservoir 16. In such embodiments where the reservoir 16 does not include an open end, the reservoir 16 can be in fluid communication with the interior lumen 21 of the fluid conduit 17, e.g., by way of one or more through-holes disposed in the upper surface (not shown) of the reservoir 16, one or more tubes passing from the reservoir 16 to the fluid conduit 17, and the like.

The various components of the blender 10 may be sealed (e.g., using gaskets, adhesive materials such as glues, and the like) as would be readily appreciated by one of skill in the art upon reading the present specification. For example, as illustrated in the example embodiment of FIG. 6, a water-tight seal gasket 62 may be disposed between the one or more reservoir walls 40 and the drive shaft 31 to provide a substantially leak-proof seal between the work chamber 12 and the reservoir 16. In so providing such a water-tight seal gasket, steam generated by heating the contents of the reservoir 16 would be forced to rise into the interior lumen 21 of the fluid conduit 17 (as oriented in FIGS. 1 through 3). The steam then may pass from the interior lumen 21 into the gap 27, then subsequently may pass from the gap 27 into the work chamber 12 (e.g., through the one or more apertures 26 formed in the cylindrical support member 35 of the processor component 18, and/or through the separation 50 between the processor component 18 and the bottom section 15 of the container 11), for cooking of food products contained therein. One of skill in the art will appreciate, however, that such a water-tight seal may not be required to direct the steam as indicated herein. Rather, other mechanical and structural features characterized by the manner in which the components are shaped and also the manner by which the components couple to each other can likewise cause the steam (or other gas) to travel along the desired path.

The present disclosure describes illustrative embodiments of a cooking process (e.g., for converting raw food into fully and/or partially cooked food) that is implemented by causing steam to pass from the reservoir 16 into the work chamber 12. Accordingly, when the steam enters the work chamber 12, heat that is stored in the steam is transferred to the food products contained in the work chamber 12, thereby causing the food products to heat, warm, cook, and/or the like. However, upon reading the present specification, it will be appreciated by one skilled in the art that many other types of gases and fluids (e.g., gas-liquid combinations, vapors, and the like) can be utilized with embodiments of the present disclosure. For example, rather that utilize steam, other forms of moisture and/or fluids may be provided from the reservoir 16 to the work chamber 12.

Figure 7:
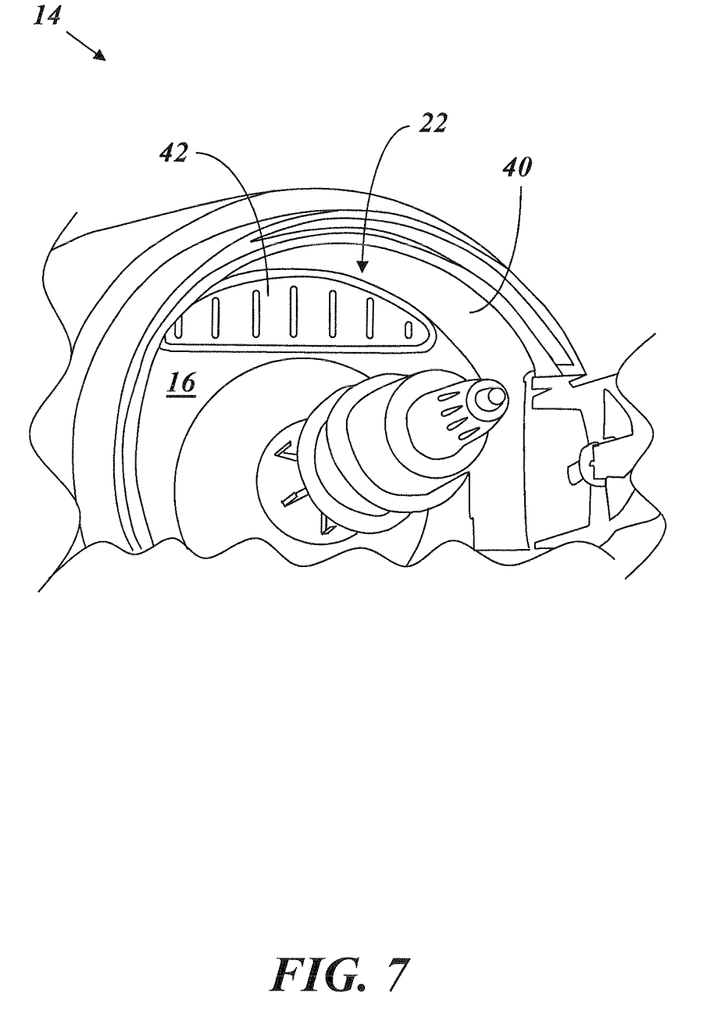
FIG. 7 is a perspective top-down view of a portion of a reservoir with a heating component disposed in the base of the blender of FIG. 1, according to aspects of the present disclosure.

The heating component 22 may be any suitable component adapted to provide heat to the contents of the reservoir 16, including but not limited to electrical resistance heat as previously described. The heating component 22 generally may be included in the reservoir 16, or may be disposed near (e.g., adjacent to) the reservoir 16. For example, FIG. 7 depicts a perspective top-down view of a portion of the base 14 (i.e., looking into the reservoir 16) in which the heating component 22 is disposed in the reservoir 16 and flush with a bottom surface of the reservoir 16. The heating component 22 may function similarly to a boiler or steam generator by converting water (or other liquid) within the reservoir 16 into steam (or other gas). In some embodiments, an air gap (not shown) may be formed below the reservoir 16, e.g., to insulate the heating component 22 from the electrical and/or mechanical interior components of the base 14 and/or to reduce the internal temperature at which the motorized drive 28 operates (e.g., for preventing the motorized drive 28 from overheating).

Figure 8:
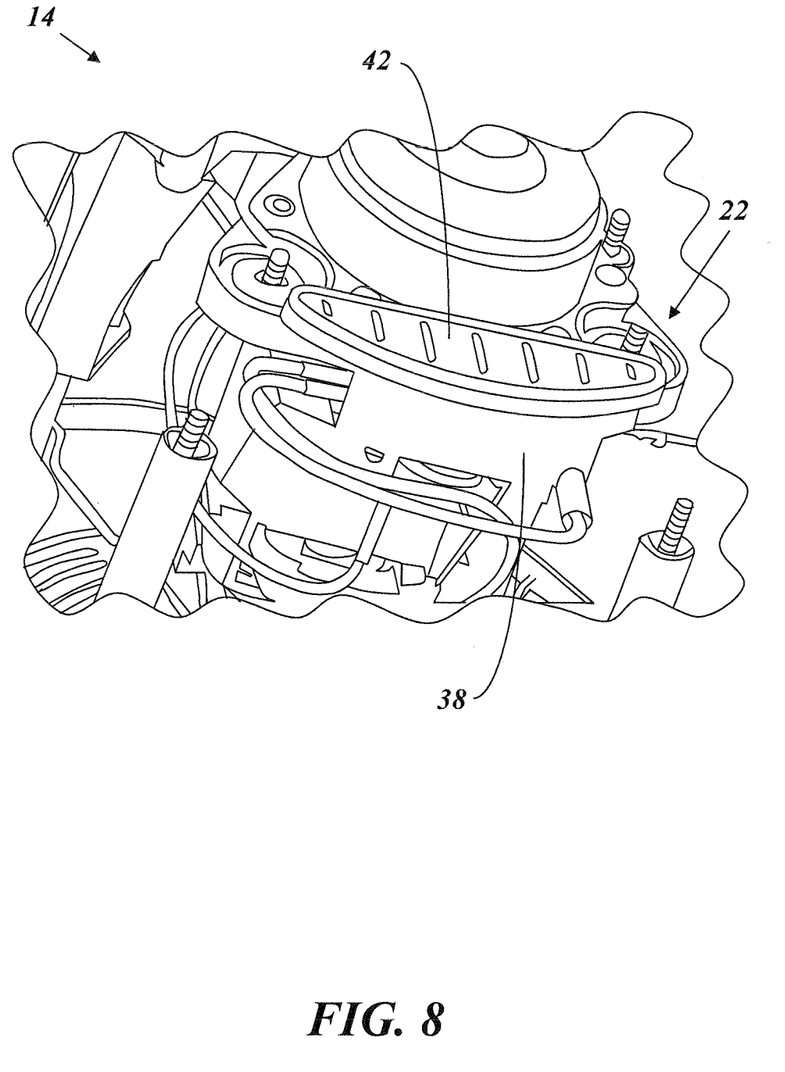
FIG. 8 is a partial perspective side-view of the heating component of FIG. 7 with certain components and walls/surfaces of the blender removed for clarity and illustration, according to aspects of the present disclosure.

Reference is made to FIG. 8, which depicts a partial perspective side-view of the heating component 22 of FIG. 7 with various components and walls/surfaces of the blender 10 removed for clarity and illustration. As illustrated, the heating component 22 may include a heating block 42 and a heating element coupled together. In some embodiments, the heating component 22 may include more or fewer heating elements 38 as necessary. In an illustrative embodiment, the heating component 22 is a 500 W resistance heat heating component. The parts forming the heating component 22 (e.g., the heating elements 38, the heating block 42, etc.) may be housed within the base 14. Upon reading the present specification, a wide variety of alternative suitable heating components 22 will be appreciated by one of skill in the art. All such alternatives and modifications are contemplated within the scope of the present disclosure. The heating component 22 can take on a variety of different configurations, implementations, placements, and the like. The present disclosure is not limited to the example embodiments provided herein.

Figure 9:
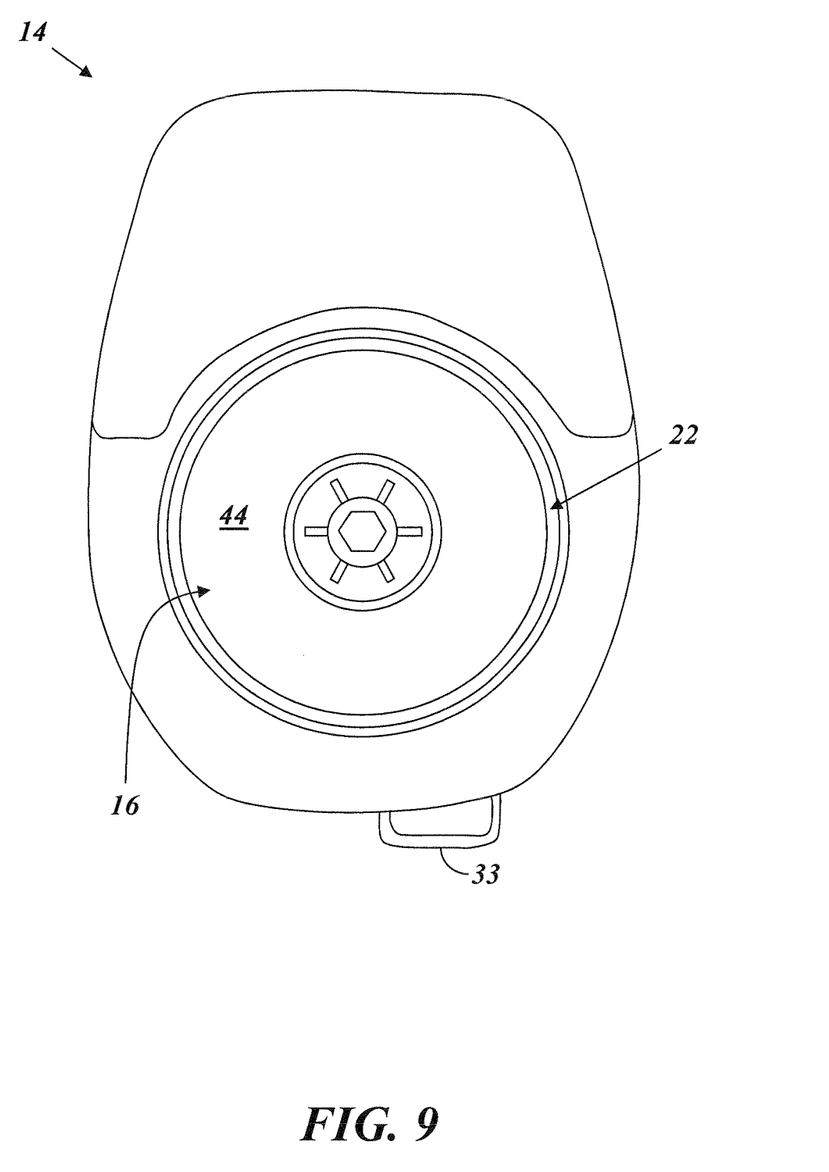
FIG. 9 is a top view of a blender that includes heating component that includes an annular heating block formed around a drive shaft and flush against a bottom surface of a reservoir, according to aspects of the present disclosure.

For example, FIG. 9 depicts an embodiment in which the heating component 22 includes an annular heating block 44 formed around the drive shaft 31 and flush against a bottom surface of the reservoir 16.

Notably, the embodiments provided herein enable a user to heat (e.g., cook, steam, etc.) and process food products in a single work chamber 12. Furthermore, though some embodiments of the present disclosure are adapted to only heat and process food separately, other embodiments are adapted to heat and process food simultaneously, in the work chamber 12. Accordingly, there is no requirement imposed upon embodiments of the present disclosure that the food product be heated and processed at separate times or at separate locations. Furthermore, in illustrative embodiments, the reservoir 16 is directly accessible by a user simply by removing the container 11 from the base 14. This feature can be utilized, e.g., to achieve smaller blenders 10 having more compact layouts/designs and greater economy of space, in accordance with certain embodiments of the present disclosure. Additionally, providing a user with direct access to the reservoir 16 enables more convenient filling of the reservoir 16 (e.g., with water or other liquid), emptying of the reservoir 16, and cleaning of the reservoir. Upon reading the present specification, one of skill in the art will appreciate yet other benefits not explicitly described herein.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. It is intended that the present disclosure be limited only to the extent required by the appended claims and the applicable rules of law.

It is also to be understood that the following claims are to cover all generic and specific features of the disclosure described herein, and all statements of the scope which, as a matter of language, might be said to fall therebetween.

What is claimed is:

1. A blender system, comprising:
   a container, comprising:
   a bottom section;
   one or more container walls extending from the bottom section and defining an interior volume of space, the interior volume of space including a work chamber for processing one or more food products;
   a fluid conduit having at least one conduit wall defining an interior lumen, the at least one conduit wall coupled to or integral with the bottom section of the container at a proximal end and extending to a distal end within the work chamber; and
   a processor component surrounding the distal end of the fluid conduit and at least a portion of an exterior side of the at least one conduit wall with a gap therebetween, the gap in fluid communication with the interior lumen and the work chamber, the processor component including at least one food processing feature; and
   the container removably coupled to a base, the base comprising:
   a motorized drive configured to provide rotational force to a drive shaft, the drive shaft coupled with the processor component;
   a reservoir in fluid communication with the interior lumen of the fluid conduit; and
   a heating component adapted to heat contents of the reservoir.

2. The blender system of claim 1, wherein when heat energy provided to a liquid disposed in the reservoir by the heating component causes transformation of the liquid into a gas, the gas flows from the reservoir through the fluid conduit and the gap, and into the work chamber.

3. The blender system of claim 1, wherein the reservoir is open at a first end, the container being removably coupled to the base at the first end of the reservoir in such a way that the fluid conduit is disposed above the reservoir and the interior lumen of the fluid conduit leads to the reservoir.

4. The blender system of claim 1, further comprising a lid removably coupled to the container at an open end of the container, the lid having one or more adjustable ventilation apertures.

5. The blender system of claim 1, further comprising a lid removably coupled to the container at an open end of the container, the lid comprising:
   a body portion;
   one or more ventilation apertures disposed through the body portion; and
   a ventilation cover adjustable between a plurality of different ventilation positions each covering a different amount of the one or more ventilation apertures.

6. The blender system of claim 5, wherein the plurality of different ventilation positions comprise a closed ventilation configuration wherein the one or more ventilation apertures in the body portion are completely obstructed.

7. The blender system of claim 6, wherein the plurality of different ventilation positions comprise one or more ventilation configurations predetermined as suitable for steaming or cooking a particular food product or category of food products.

8. The blender system of claim 1, wherein the at least one food processing feature comprises one or more cutting blades, one or more mixing paddles, or both.

9. The blender system of claim 1, wherein the motorized drive comprises an electric motor and a pulley system, a gear system, or both.

10. The blender system of claim 1, wherein the base further comprises a control unit coupled to the motorized drive and adapted to control movement of the drive shaft and thereby the processor component.

11. The blender system of claim 1, wherein the container further comprises:
    a locking mechanism adapted to releasably lock with the base; and
    an actuator adapted to enable release of the locking mechanism.

12. The blender system of claim 1, wherein the processor component is removably coupled to the fluid conduit and adapted to remain removably coupled to the fluid conduit when the container is removed from the base.

13. The blender system of claim 1, wherein the at least one food processing feature comprises one or more cutting blades, one or more mixing paddles, or both.

14. A container for a blender system, the container comprising:
    a bottom section;
    one or more container walls extending from the bottom section and defining an interior volume of space, the interior volume of space including a work chamber for processing one or more food products;
    a fluid conduit having at least one conduit wall defining an interior lumen, the at least one conduit wall coupled to or integral with the bottom section of the container at a proximal end and extending to a distal end within the work chamber; and
    a processor component surrounding the distal end of the fluid conduit and at least a portion of an exterior side of the at least one conduit wall with a gap therebetween, the gap in fluid communication with the interior lumen and the work chamber, the processor component including at least one food processing feature;

wherein coupling the container to a base causes the processor component to couple with a drive shaft coupled to a motorized drive in the base, and establishes fluid communication between the interior lumen of the fluid conduit and a reservoir in the base.

15. The container of claim 14, wherein the container is adapted to removably couple with the base and be received by a first open end of the reservoir in such a way that the fluid conduit is disposed above the reservoir and the interior lumen of the fluid conduit leads to the reservoir.

16. The container of claim 14, further comprising a lid removably coupled to the container at an open end of the container, the lid having one or more adjustable ventilation apertures.

17. The container of claim 14, further comprising a lid removably coupled to the container at an open end of the container, the lid comprising:
   a body portion;
   one or more ventilation apertures disposed through the body portion; and
   a ventilation cover adjustable between a plurality of different positions each covering a different amount of the one or more ventilation apertures.

* * * * *